(12) United States Patent
Peng

(10) Patent No.: US 6,233,136 B1
(45) Date of Patent: May 15, 2001

(54) STRUCTURE OF WATER AND DUST-PROOF CONTROL BOX

(76) Inventor: Hsiu-Min Peng, No. 56, Min Sheng Street, Feng-Yuan City 42041 (TW)

( * ) Notice: Subject to any disclaimer, the term of this patent is extended or adjusted under 35 U.S.C. 154(b) by 0 days.

(21) Appl. No.: 09/487,824

(22) Filed: Jan. 18, 2000

(51) Int. Cl.[7] ..................................................... H02B 1/00
(52) U.S. Cl. .......................... 361/600; 361/601; 361/622; 361/623; 174/52.1; 174/52.3; 312/223.1
(58) Field of Search .................................... 361/600, 601, 361/614, 631, 628, 643, 644, 679, 724; 174/52.1, 52.3

(56) References Cited

U.S. PATENT DOCUMENTS

| | | | | |
|---|---|---|---|---|
| 4,063,661 | * | 12/1977 | Doby | 220/293 |
| 4,800,401 | * | 1/1989 | Sato et al. | 361/293 |
| 4,878,154 | * | 10/1989 | Wang | 361/741 |
| 5,245,507 | * | 9/1993 | Ericksen | 361/641 |
| 5,770,817 | * | 6/1998 | Lo | 174/57 |
| 5,838,533 | * | 11/1998 | Yazaryan et al. | 361/600 |

FOREIGN PATENT DOCUMENTS

401085513A * 3/1989 (JP).
405168555A * 7/1993 (JP).

* cited by examiner

Primary Examiner—Leo P. Picard
Assistant Examiner—Boris L. Chervinsky

(57) ABSTRACT

The present invention of a water and dust-proof control box structure mainly comprises a semi-box and a side cover. The semi-box having a panel board, a side board, an upper board and a lower board. The panel board having few holes and mounting spaces for inserting a turning knob and a sliding button. The control box can accommodate few IC boards. A back board is disposed at the back of the side cover, the side cover also having an upper board and a lower board. Few positioning blocks are disposed on the inner wall of the panel board, screw holes are disposed inside the positioning blocks for fixing a positioning board. A control knob and a switch are mounted on the positioning board, the control knob and the switch are capped by a water-proof cap or a water-proof pad. The water-proof cap or the water-proof pad are pressed against to the inner wall of the panel board by the turning knob and the switch. A water-proof piece is stuck on outside the panel board. To finish assembling, a water-proof frame pad is placed on the back of the panel board and on the top of the control box for preventing water and dust from getting inside, also for preventing the control knob and the switch from falling off.

5 Claims, 5 Drawing Sheets

STRUCTURE OF WATER AND DUST-PROOF CONTROL BOX

BACKGROUND OF THE INVENTION

The present invention relates to water fountain and more particularly to a structure of water and dust-proof control box for use in food machinery.

Conventional automatic conveyer devices have control boxes and so do food processing machinery since they are becoming more automatic. Control devices such as buttons, switches or turning knobs of the control boxes sometimes malfunction because of improper electrical contact, the problem is especially serious in the control boxes of food processing machinery because flour, water or dust can easily get in. As shown in FIGS. 1 and 2, a conventional control box mainly comprises a main box 10 and a back cover 20. The main box 10 is formed in one piece with a panel 11 at the front which is connected to four side boards 12. Holes 111 and 112 with mounting space around them are disposed on the panel 11. The mounting space of holes 111 and 112 are corresponding to a turning knob 113 and a switch 114 respectively for connecting together. The turning knob 113 and the switch 114 are connected by wires to an IC board 21 of the back cover 20. The back of the turning knob 113 is connected to a control knob 22 of the back cover 20. An elastic positioning piece 23 is disposed on the back cover 20 for mounting into a mounting hole 13 on the main box 10. The conventional control box has the following drawbacks:

1. The main box 10 is not directly connected to the IC board 21 which is connected to the back cover 20 instead, this make it more difficult to assemble.

2. Water, flour or dust can easily get into the control devices such as the turning knob 113 and the switch 114 through the holes 111 and 112, thus causing improper electric contact, short-circuit or malfunction. This problem is especially seriously and commonly found in food processing machinery.

3. Because the switch 114 and the turning knob 113 are only resting on the panel 11, this can easily depart from the main box 10 if being used very often. The connection between the control knob 22 and the turning knob 113 can also easily get loosed by turning and pressing manually.

SUMMARY OF THE PRESENT INVENTION

The present invention relates to a water and dust-proof control box structure. It mainly comprises a semi-box and a side cover. The semi-box having a panel board, a side board, a upper board and a lower board. The upper and the lower boards having few positioning holes. The panel board having few holes and mounting spaces for inserting a turning knob and a switch. The side cover having protruded bars for mounting into the positioning holes of the semi-box. The control box can accommodate few IC boards. The side cover having a back board, a upper board and a lower board. The panel board having few positioning blocks with screw holes for positioning with a positioning board. The positioning board having a control knob and a switch disposed on it. The control knob and the switch are capped by water-proof pads which are pressed against the innerwall of the panel board. A water-proof cover is disposed on the panel board. A water-proof frame pad is then placed on the inner wall of the panel board sticking out from the control box. This can prevent water and dust from getting in and the control knob and the switch from loosing and fall off.

The main purpose of the present invention of a water and dust-proof control box structure is to provide a means of preventing water and dust from getting in and also, it is also a easy-to-assemble device structure with low malfunction rate. Another purpose is prevent the control devices such as the control knob and the switch from loosing and fall off, which is firmly assembly into the control box.

The present invention will become more fully understood by reference to the following detailed description thereof when read in conjunction with the attached drawings.

DETAILED DESCRIPTION OF THE PREFERRED EMBODIMENT

Figure 1:
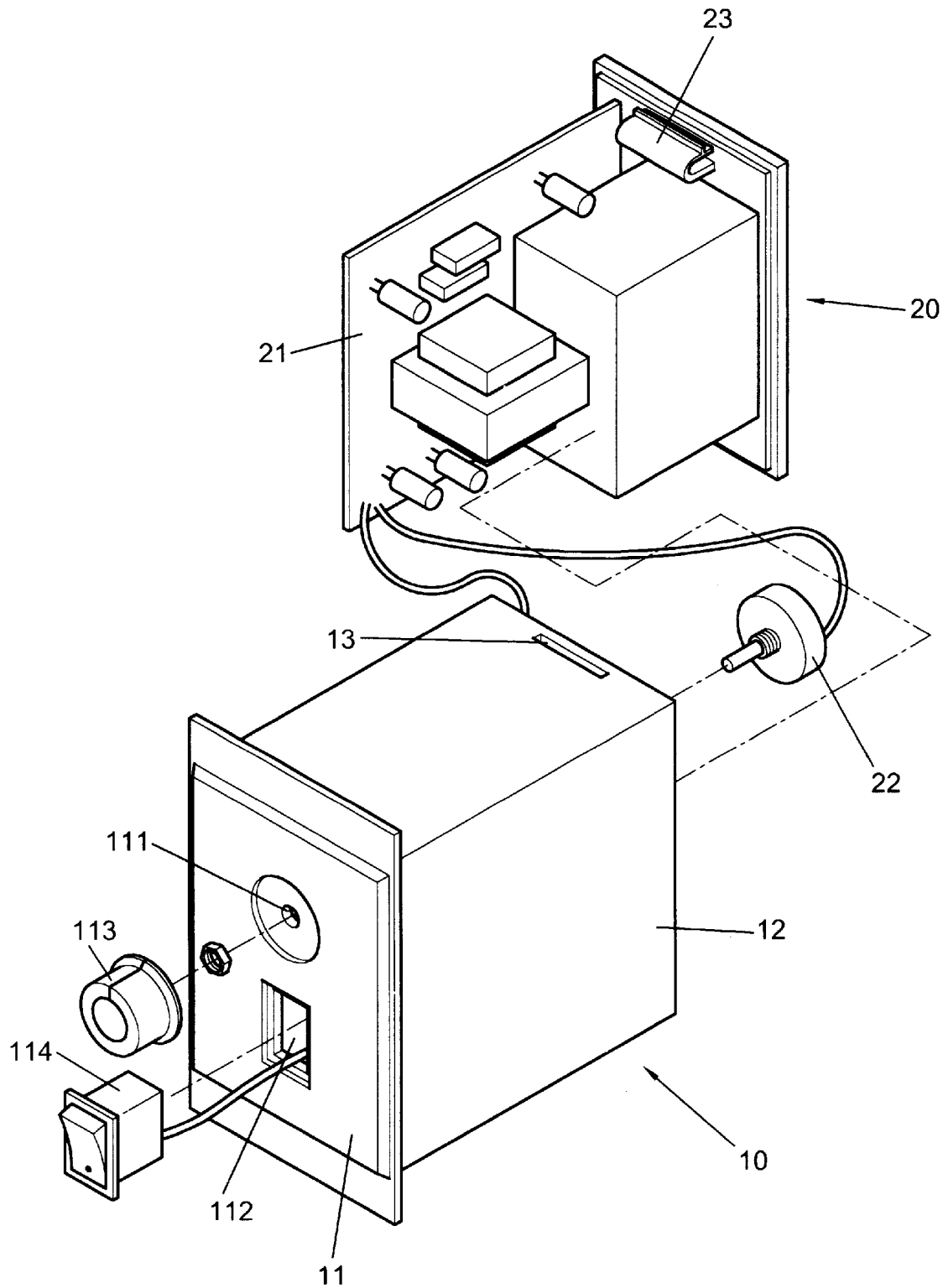
FIG. 1 is an exploded perspective view of a conventional control box.
Figure 2:
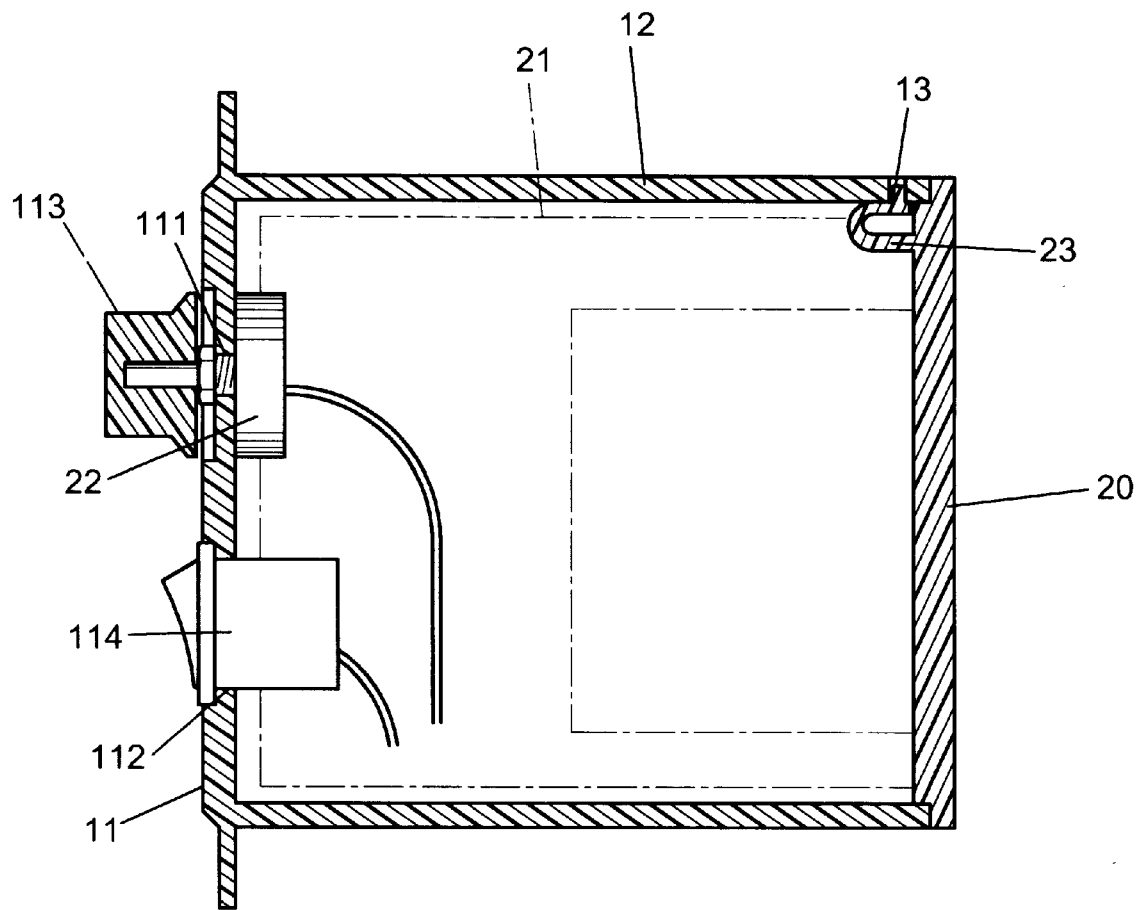
FIG. 2 is a sectional assembly view of a conventional control box.
Figure 3:
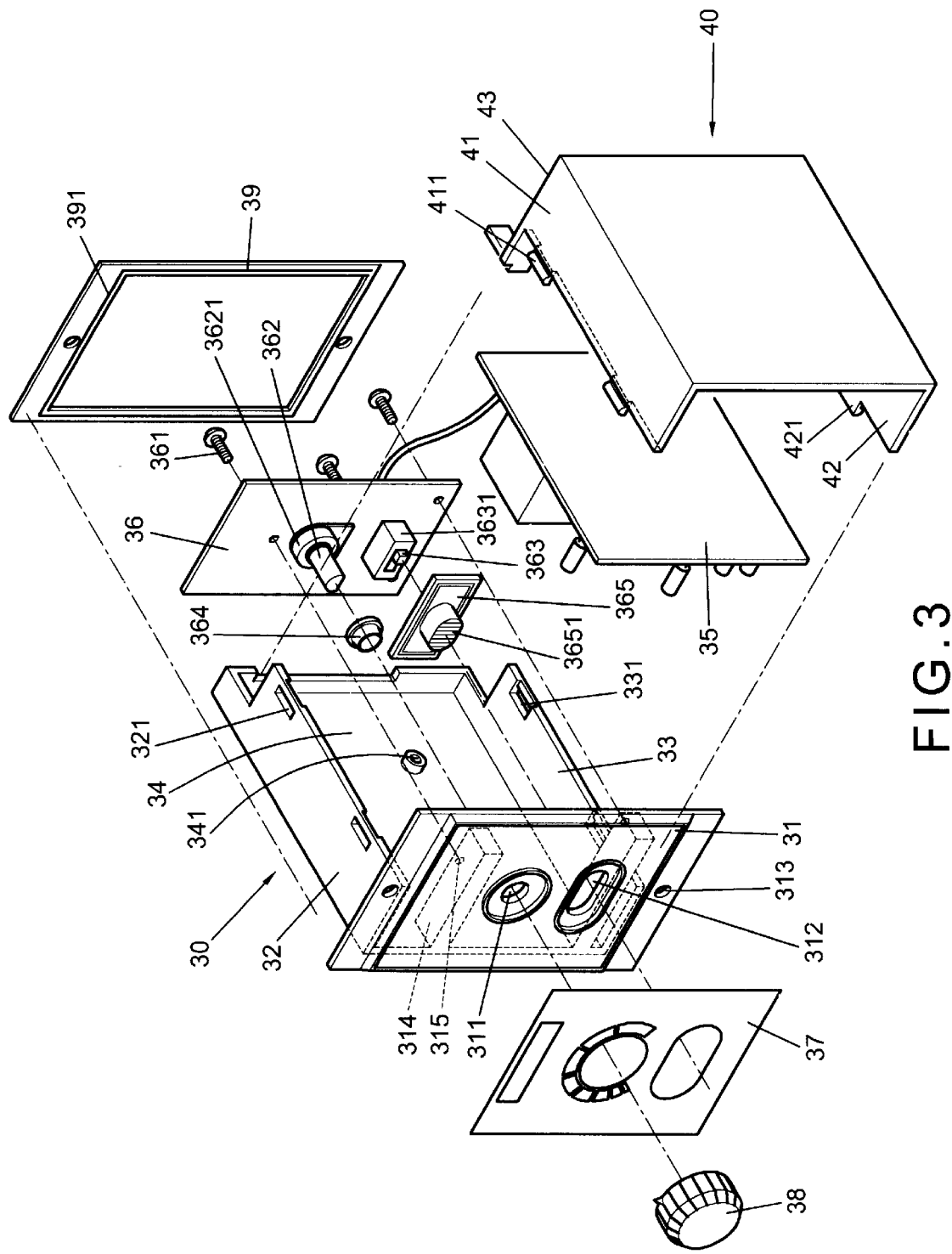
FIG. 3 is an exploded perspective view of a control box of the present invention.
Figure 4:
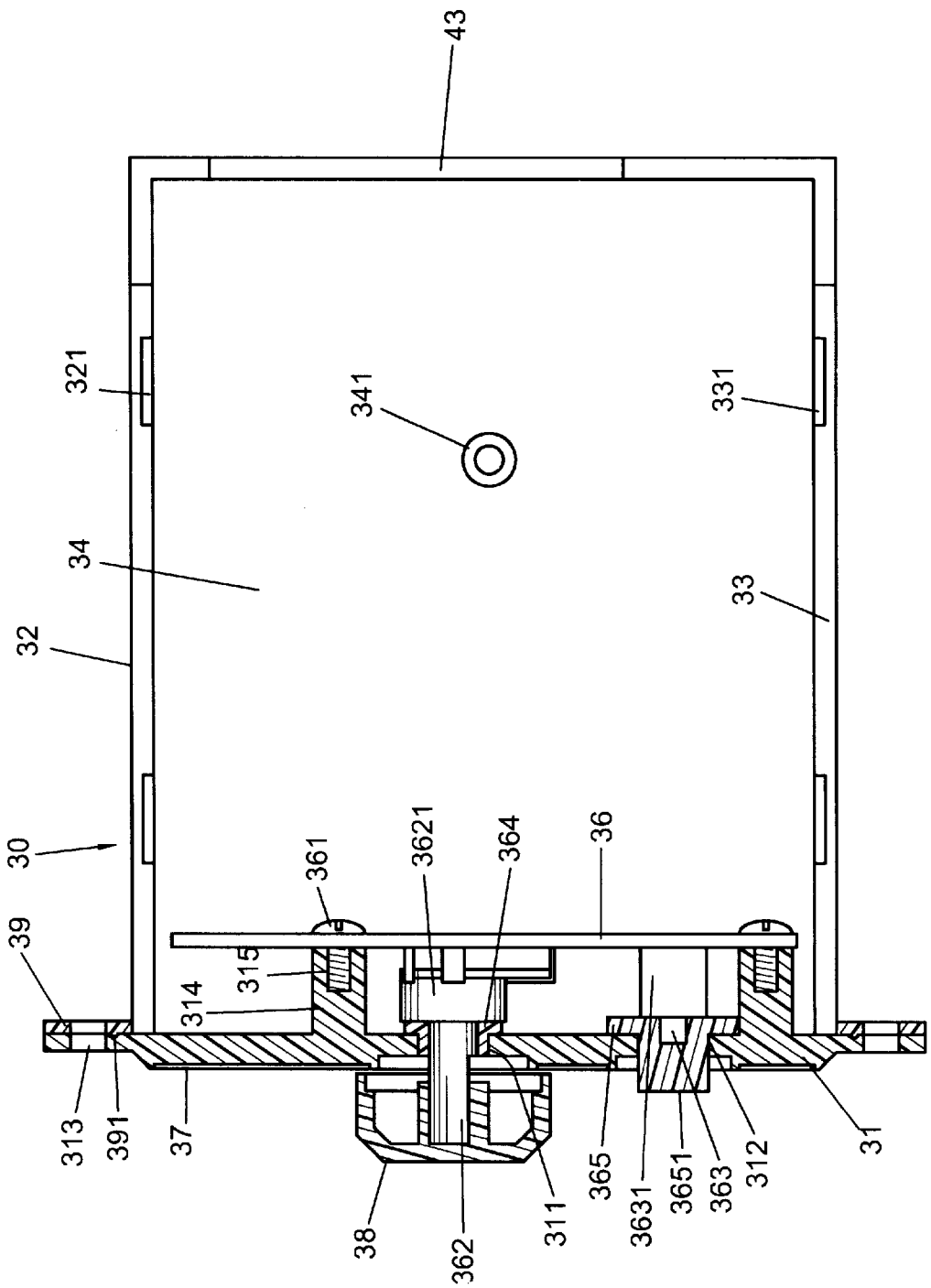
FIG. 4 is partial sectional assembly view of a control box of the present invention.
Figure 5:
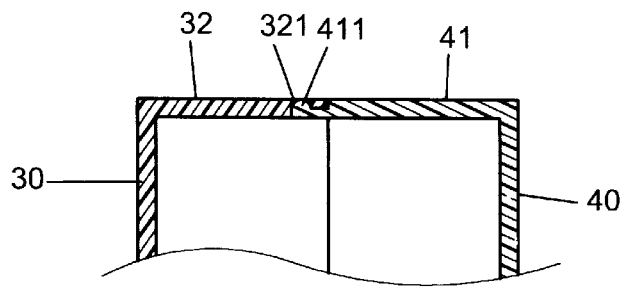
FIG. 5 is a sectional view of the present invention wherein the positioning hole of the semi-box being mounted with the protruded bars of the side cover.
Figure 6:
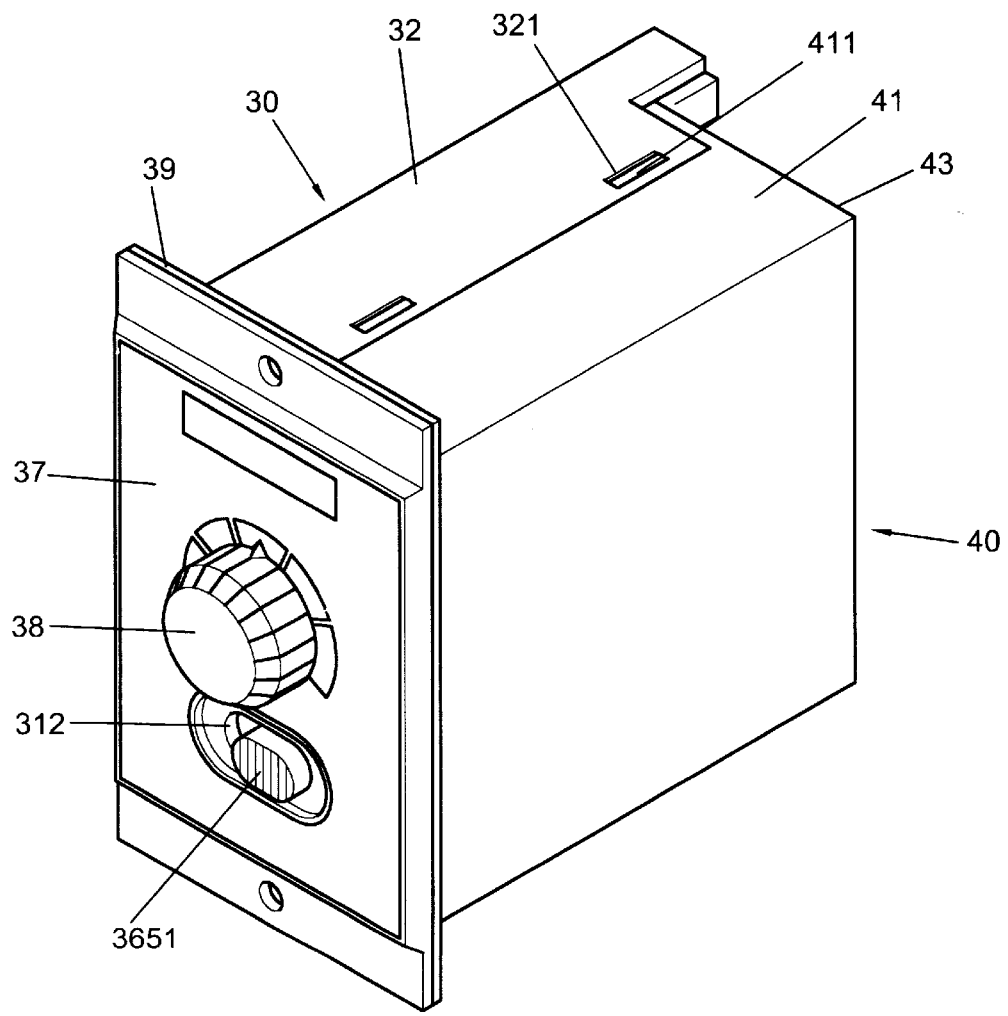
FIG. 6 is perspective assembly view of a control box of the present invention.

The present invention of a control box structure being mounted on food processing machinery as referring to FIG. 3. It mainly comprises a semi-box 30 and a side cover 40 which can be connected together. The semi-box 30 having a panel board 31, an upper board 32, a lower board 33 and a side board 34. The panel board 31 having holes 311 and 312 and two screw holes 313 disposed on its top and bottom. Two positioning blocks 314 are protruded from the inner wall of the panel board 31, screw holes 315 are disposed on the positioning blocks 314. The upper board 32 and the lower board 33 having a positioning hole 321 and a positioning hole 331 respectively. The side cover 40 also having an upper board 41 and a lower board 42 with the same width. Both the upper board 41 and the lower board 42 having protruded bars 411 and 421 respectively for inserting into the positioning holes 321 and 331 of semi-box 30. The side cover 40 also having a back board 43. After assembling the semi-box 30 and the side cover 40, an IC board 35 can be accommodated inside the control box. The IC board 35 can be fixed to a protruded bar 341 of the side board 34 of the semi-box 30. A positioning board 36 is fixed to the positioning blocks 314 by few screws 361. The positioning board 36 can also be an IC board with a control knob 362 and a switch 363. The control knob 362 and the switch 363 can be inserted into the holes 311 and 312 of the panel board 31 respectively. The back end of the control knob 362 is a round cap 3621 having few legs(not shown in the figure) going through the positioning board 36 and being welded. The back end of the switch 363 is a small box body 3631 having a leg(not shown in the figure) going through the positioning board 36 and being welded. The control knob 362 is capped with a water-proof cap 364 having two pad rings, one is for inserting into the hole 311 and the another is for pressing against the panel board 31. The switch 363 having a water-proof pad 365 and a sliding button 3651. The water-proof pad 365 is pressed against the inner wall of the hole 312 of the panel board 31, the sliding button 3651 is exposed outside the hole 312 of the panel board 31. The water-proof pad 365 and the sliding button 3651 is formed on one piece with room inside for inserting the switch 363. A water-proof piece 37 is disposed on the panel board 31. The control knob 362 is connected to a turning knob 38. A water-proof frame pad 39 is disposed on the back of the panel board 31 and is fixed to the screw holes 313 of the panel board 31 by screws. The water-proof frame pad 39 having a protruded edge 391 to prevent water and dust from getting from outside the panel board 31.

Accordingly, the present invention of a water and dust-proof control box structure, mainly comprises the panel board 31 which is exposed outside the control box for preventing water and dust from getting in. Referring to FIGS. 3, 4, 5 and 6, when assembling the control box, put the water-proof cap 364 and the water-proof pad 365 on the control knob 362 and the switch 363 respectively, fix the positioning board 36 on the positioning blocks 314 of the panel board 31, then fix the IC board 35 with the side board 34, assemble the semi-box 30 and the side cover 40 together by inserting the protruded bars 411 and 421 into the positioning holes 321 and 331, then stick the water-proof piece 37 on the panel board 31, cap the control knob 362 with the turning knob 38. Install the water-proof frame pad 39 on the back of the panel board 31 by screwing through the screw holes 313 of the panel board 31 with screws before putting the control box into a food processing machine.

The present invention prevents water and dust from getting inside by fixing the positioning board 36 on the positioning blocks 314 of the panel board 31, then using the round cap 3621 and the small box body 3631 press against the water-proof cap 364 and the water-proof pad 365 respectively, the control knob 362 and the switch 363 are fixed firmly on the positioning board 36.

The present invention has the following advantages:

1. The control devices on the panel board 31 can prevent water and dust from getting inside and cause electrical malfunction;

2. Easier to assemble by assembling the semi-box 30 and the side cover 40 together which can make it easier to position the IC board 35 and the positioning board 36;

3. Help to stable the control knob 362, the switch 363, the turning knob 38 and the sliding button 3651 which can reduce the chance of falling off and breaking;

Although the invention has been explained in relation to the preferred embodiment, it is to be understood that many other possible modifications and variations can be made without departing from the spirit and scope of the invention as hereinafter claimed.

I claim:

1. A water and dust control box structure comprises a semi-box and a side cover, the semi-box having a panel board, a side board, an upper board and a lower board, the upper and the lower boards having few positioning holes, the panel board having few holes for inserting a turning knob and a sliding button, the side cover having protruded bars for mounting with the positioning holes of the semi-box, the control box can accommodate few IC boards, the side cover having a back board at the back, also having an upper board and a lower board, few positioning blocks are disposed on the inner wall of the panel board, the positioning blocks having screwing holes for fixing a positioning board, a control knob and a switch capped by a water-proof cap and a water-proof pad respectively are disposed on the positioning board, the water-proof cap and the water-proof pad are being pressed against the inner wall of the panel board by the control knob and the switch on the positioning board, a water-proof piece is stuck outside on the panel board, a water-proof frame pad is fixed on the back of the panel board to prevent water and dust from getting in and to prevent the control knob and the switch from getting loosed.

2. The water and dust-proof control box structure as claimed in claim 1 wherein the width of the upper board and the lower board of the semi-box is smaller than half of the width of the panel board, and is the same to the upper board and the lower board of the side cover.

3. The water and dust-proof control box structure as claimed in claim 1 wherein the water-proof cap on the control knob is a double pad ring.

4. The water and dust-proof control box structure as claimed in claim 1 wherein the water-proof pad on the switch is in sliding button shape, the water-proof pad and the sliding button is formed in one piece.

5. The water and dust-proof control box structure as claimed in claim 1 wherein the positioning board can be an IC board for connecting circuit to the control knob and the switch.

* * * * *